(12) United States Patent
Radzikh

(10) Patent No.: US 12,328,044 B2
(45) Date of Patent: Jun. 10, 2025

(54) IN WHEEL AXIAL FLUX YOKELESS OUTRUNNER ELECTRIC MOTOR PROVIDING CABLES AND COOLING INTERNALLY

(71) Applicant: Yuriy Radzikh, Jenkintown, PA (US)

(72) Inventor: Yuriy Radzikh, Jenkintown, PA (US)

( * ) Notice: Subject to any disclaimer, the term of this patent is extended or adjusted under 35 U.S.C. 154(b) by 206 days.

(21) Appl. No.: 17/861,145

(22) Filed: Jul. 8, 2022

(65) Prior Publication Data
US 2023/0010171 A1 Jan. 12, 2023

Related U.S. Application Data

(60) Provisional application No. 63/219,713, filed on Jul. 8, 2021.

(51) Int. Cl.
*H02K 16/02* (2006.01)
*B60K 7/00* (2006.01)
*H02K 1/12* (2006.01)
*H02K 7/00* (2006.01)

(52) U.S. Cl.
CPC ........... *H02K 16/02* (2013.01); *B60K 7/0007* (2013.01); *H02K 1/12* (2013.01); *H02K 7/003* (2013.01)

(58) Field of Classification Search
None
See application file for complete search history.

(56) References Cited

U.S. PATENT DOCUMENTS

| | | | | |
|---|---|---|---|---|
| 11,670,987 B1* | 6/2023 | Gabrys | ............. | H02K 21/22 310/54 |
| 2004/0212259 A1* | 10/2004 | Gould | ............. | H02K 7/14 310/67 R |
| 2008/0070736 A1* | 3/2008 | Yoshino | ............. | B60K 7/0007 301/6.5 |
| 2011/0284300 A1* | 11/2011 | Cheng | ............. | H02P 25/08 310/46 |
| 2014/0042796 A1* | 2/2014 | Park | ............. | B60K 7/0007 301/6.5 |
| 2021/0178893 A1* | 6/2021 | Yang | ............. | H02K 7/003 |
| 2021/0313851 A1* | 10/2021 | Zhou | ............. | H02K 1/145 |

* cited by examiner

*Primary Examiner* — Bernard Rojas
(74) *Attorney, Agent, or Firm* — Douglas J. Ryder; Ryder, Mazzeo & Konieczny LLC

(57) ABSTRACT

An electric motor including a stator between a first and second rotor. The stator and the rotors are mounted to non-rotating shaft. The stator includes a plurality of windings and the first and second rotors include a plurality of magnets on a side thereof facing the stator. An opening internal to the electric motor is to provide cables and cooling to the stator. A hub is secured to opposite side of the first rotor as the plurality of magnets and rotates with rotation of the rotors. The hub includes a plurality of bolts extending therefrom to mount a rim thereto by placing the bolts through aligned holes in the rim. The motor is mounted in each wheel assembly of an electric automobile so that each wheel thereof is controlled by its own motor.

14 Claims, 6 Drawing Sheets

IN WHEEL AXIAL FLUX YOKELESS OUTRUNNER ELECTRIC MOTOR PROVIDING CABLES AND COOLING INTERNALLY

BACKGROUND

Electric vehicles (e.g., automobiles) are becoming more popular as they provide a cleaner alternative to gas vehicles. Electric vehicles utilize one or more electric motors to convert electrical energy into mechanical energy and the mechanical energy is utilized to move the vehicles. A typical electric motor includes a stationary component (called a stator) that includes a plurality of coils and a rotating component (called a rotor) that includes a plurality of magnets. When activated the coils create a magnetic field and the magnetic field and the magnets repel or attract each other in a sequence that causes the rotors to spin and create torque.

FIG. 1 illustrates an example radial flux electric motor 100. The motor 100 includes a rotor 110 mounted to a shaft 120. The rotor 110 includes a plurality of magnets 130 mounted on an exterior perimeter thereof. The polarity of the magnets 130 alternates (alternating polarities identified by different color magnets). A stator 140 surrounds the rotor 110 and has plurality of teeth having coils wrapped therearound (teeth and coils not visible) located on an inner perimeter thereof. The coils and magnets 130 are radially located around the shaft 120 (axis) of the motor 100. As the rotor 110 turns within the stator 140, flux 150 is transmitted from a magnet 130 having a first polarity to the stator 140 every time the magnet 130 sweeps past a coil. The stator 140 provides a return path for the flux 160 to a magnet 130 having an opposite polarity every time the magnet 130 sweeps past a coil. So, the path of the flux 150, 160 is perpendicular to the axis (shaft 120) of the motor 100 in that it goes from the rotor 110 outward to the stator 140, and then returns inward from the stator 140 to the rotor 110.

FIG. 2 illustrates an example axial flux electric motor 200. The motor 200 includes a rotor 210 and a pair of stators 220 (only back stator 220 is illustrated) mounted on a shaft 230. The rotor 210 includes a plurality of magnets 240 mounted on one the sides thereof. The polarity of the magnets 240 alternates (alternating polarities identified by different color magnets). The stators 220 include a plurality of coils (not visible) formed on one side thereof. The coils and magnets 240 are axially located around the shaft 230 (axis) of the motor 200 (are parallel to the shaft 230). As the rotor 210 turns, flux 250 is transmitted from a magnet 240 having a first polarity to the stator 220 every time the magnet 240 sweeps past a coil. The stator 220 provides a return path for the flux 260 to a magnet 240 having an opposite polarity every time the magnet 240 sweeps past a coil. So, the path of the flux 250, 260 is parallel to the axis (shaft 230) of the motor 200.

FIG. 3 illustrates a cross sectional view of an example axial flux electric motor 300. The motor 300 includes a rotor 310 located between a pair of stators 330. The rotor 310 includes a plurality of magnets 320 on each side thereof. The polarity of the magnets 320 on each side of the rotor 310 alternates. Additionally, magnets 320 aligned on opposite sides of the rotor 310 have opposite polarities. Each of the stators 330 include a plurality of teeth 340 on an interior surface thereof and coils 350 are wrapped around each of the teeth 340. As the rotor 310 turns, flux 360 is transmitted from a magnet 320 having a first polarity (north as illustrated) to a coil 350 on the stator 330 every time the magnet 320 sweeps past a coil 350. The stators 330 provide a return path for the flux 360 from a next coil 350 to a magnet 320 having an opposite polarity (south as illustrated) every time the magnet 320 sweeps past a coil 350. The flux 360 is illustrated as flowing from a first coil 350 on an upper stator 330 through opposite pole magnets 320 (south to north) on the rotor 310 to an aligned coil 350 on a lower stator 330. The lower stator 330 provides a return path for the flux 360 so the flux 360 flows from a second coil 350 on the lower stator 330 through opposite pole magnets 320 (north to south) on the rotor 310 to an aligned coil 350 on the upper stator 330. The stators 330 act as the housing (yoke) for the motor 300.

FIG. 4 illustrates a cross sectional view of an example yokeless axial flux electric motor 400. The motor 400 includes a stator (not separately identified) located between a pair of rotors 430. As the stator is centrally located it does not act as the housing (thus there is no yoke). The stator includes a plurality of teeth 410 having coils 420 wrapped therearound. The rotors 430 include a plurality of magnets 440 on interior surfaces thereof. The polarity of the magnets 440 on each rotor 430 alternate. Additionally, magnets 440 aligned on opposite rotors 430 have opposite polarities. As the rotors 430 turn, flux 450 is transmitted from a magnet 440 having a first polarity (south as illustrated) to a coil 420 on the stator every time the magnet 440 sweeps past a coil 420. The flux 450 flows from the coil 420 to a magnet 440 having a second polarity (north as illustrated) every time the magnet 440 sweeps past a coil 420. The rotors 430 provide a return path for the flux 450. The flux 450 is illustrated as flowing from a first polarity (south) magnet 440 on an upper rotor 430 through a first coil 420 on the stator to a second polarity (north) magnet 440 on a lower rotor 430. The lower rotor 430 provides a return path for the flux 450 so the flux 450 flows from a first polarity (south) magnet 440 on the lower rotor 430 through a second coil 420 on the stator to a second polarity (north) magnet 440 on the upper rotor 430.

The yokeless axial flux electric motor 400 may include some type of housing so the turning rotors 430 are covered. However, the housing utilized is thinner and lighter than utilizing the stator as the housing (yoke). Accordingly, the yokeless axial flux electric motors 400 are much lighter and thinner than the radial flux motors. Furthermore, they operate more efficiently and have a higher power density. However, as the coils 420 are centrally located and a yoke is not utilized as a heat sink, issues associated with these motors include providing electrical cables to the coils and providing cooling thereto.

FIG. 5 illustrates a cross sectional view of an example axial flux yokeless motor 500. The motor 500 includes a stator 510 and a pair of rotors 520 mounted on a shaft 530. The stator 510 is centrally located and includes bearings 515 that contact the shaft 530 so that the shaft 530 can rotate within the stator 510 while the stator 510 remains stationary. The rotors 520 are located on each side of the stator 510 and are secured to the shaft 530 so that when they rotate, they also rotate the shaft 530. The stator 510 includes windings 540, and the rotors 520 include magnets 550 facing the stator 510. The polarity of the magnets 550 alternates on each rotor 520 and also between each rotor 520.

The stator 510 may be larger than the rotors 520 and include a circular exterior 560 casing around a perimeter thereof (illustrated as top and bottom in cross sectional view). Sidewalls 570 may be located external to the rotors 520 to seal the motor 500. The sidewalls 570 include bearings 575 that contact the shaft 530 so that the shaft 530 can rotate therewithin while the sidewalls 570 remain stationary. The sidewalls 570 may be secured to the stator casing 560. The power and cooling may be provided to the motor 500 via one or more channels 580 located external to the stator casing 560. The motor 500 is referred to as an inrunner motor since the rotors 520 are protected by the casing 560 and the sidewalls 570. Accordingly, the shaft 530 is rotated by the rotors 520 and the shaft 530 is utilized to provide the mechanical energy.

FIG. 6 illustrates an electric automobile 600 utilizing an inrunner axial flux yokeless electric motor (e.g., 500 from FIG. 5). The motor 500 is mounted on a shaft 610 and causes the shaft 610 to spin. The spinning shaft 610 is then utilized to provide mechanical energy (torque, rotation) to one or more axels 620. A gear box 630 may be utilized to convert the speed of the shaft 610 to the desired speed of an axel 620. The axels 620 are connected to a hub 640 that enable rim 650 and wheel 660 to be mounted thereto. The hub 640 includes bolts 670 extending therefrom that align with holes (not illustrated) in the rim 650. The rim 650 is secured in place with lug nuts (not illustrated). The speed and direction of the rotation of the axels 620 cause the automobile to move in the desired direction and the desired speed.

The size, weight and efficiency of yokeless axial flux motors 500 enables multiple motors to be utilized in an automobile. According to one embodiment, separate motors may be included in the center of the automobile with one motor controlling each axel and wheel.

BRIEF DESCRIPTION OF THE DRAWINGS

The features and advantages of the various embodiments will become apparent from the following detailed description in which.

DETAILED DESCRIPTION

The size of the axial flux motors may enable the motors to be utilized within a wheel assembly so that each wheel is provided with its own motor. In such an arrangement, the rotors may be utilized to directly turn the wheel instead of utilizing the shaft and possibly a gear box. Utilizing the rotors to directly rotate the wheel, and not utilizing a gear box, means that the motor needs to operate at the desired speed as the speed is not altered by the gear box. A configuration that utilizes the rotors to turn the wheels is often referred to as outrunner since the rotors can be accessed external to the motor.

Figure 1:
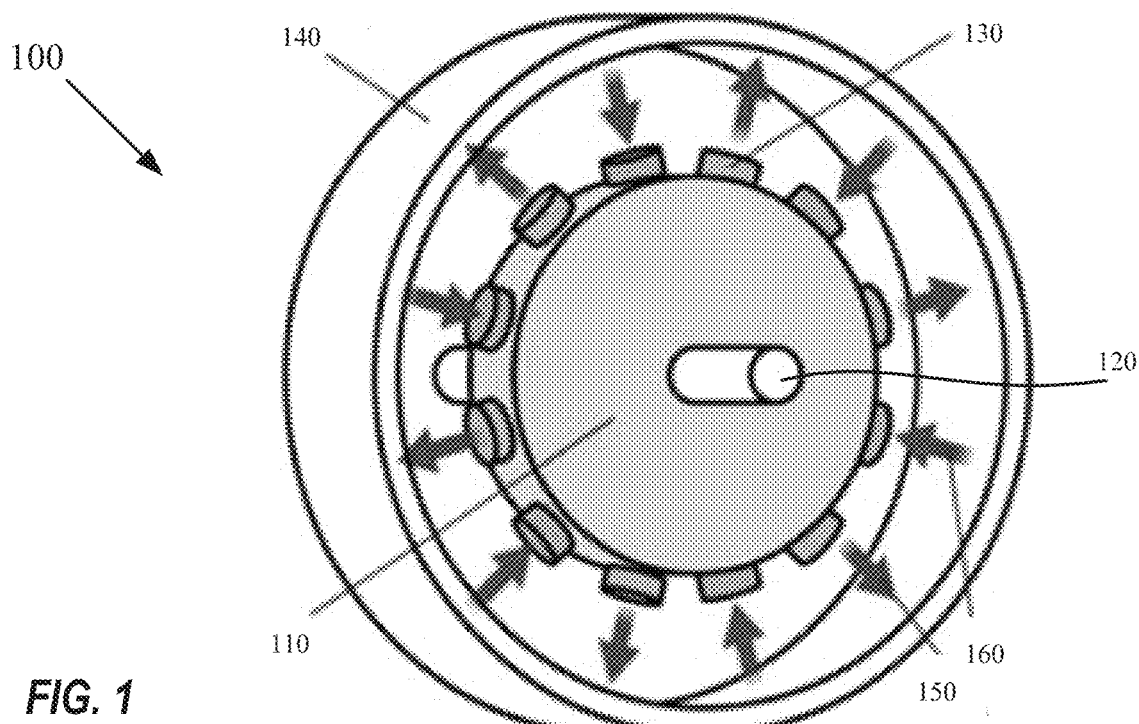
FIG. 1 illustrates an example radial flux electric motor.
Figure 2:
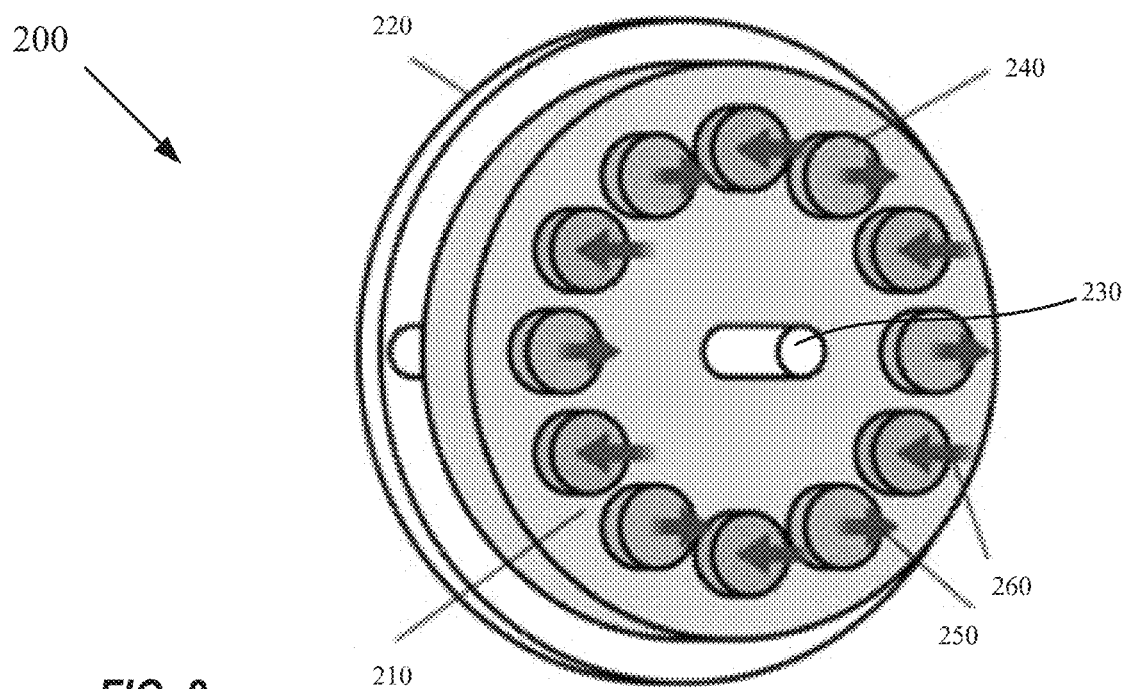
FIG. 2 illustrates an example axial flux electric motor.
Figure 3:
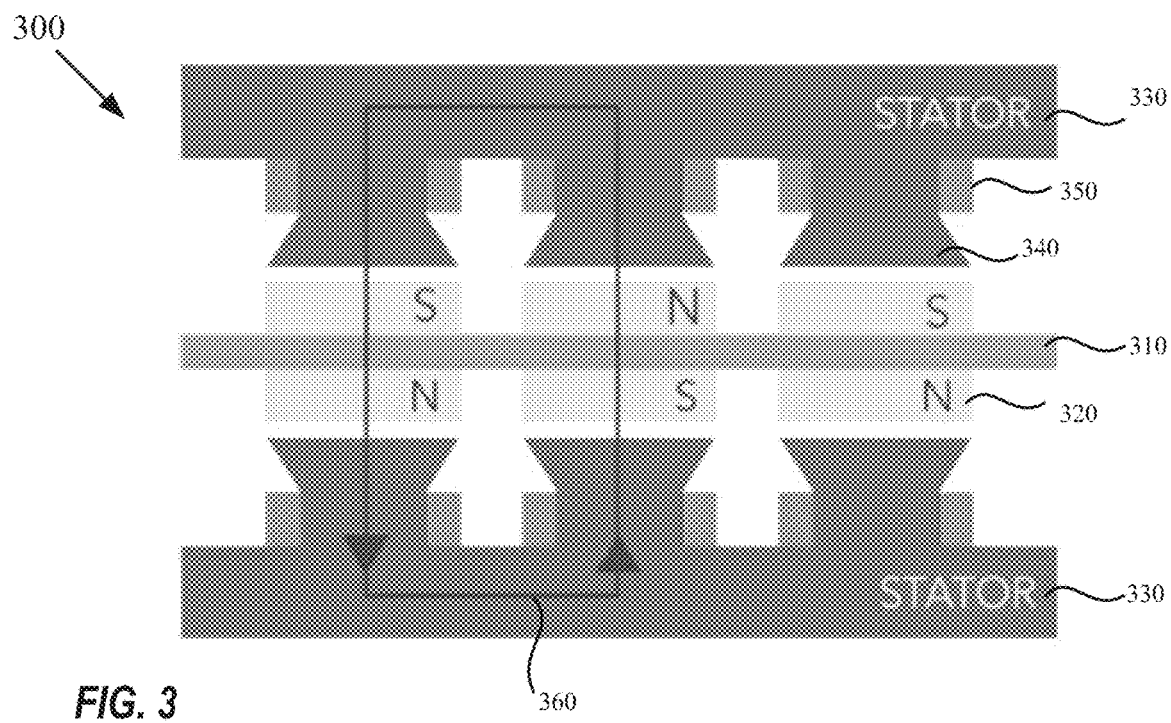
FIG. 3 illustrates a cross sectional view of an example axial flux electric motor.
Figure 4:
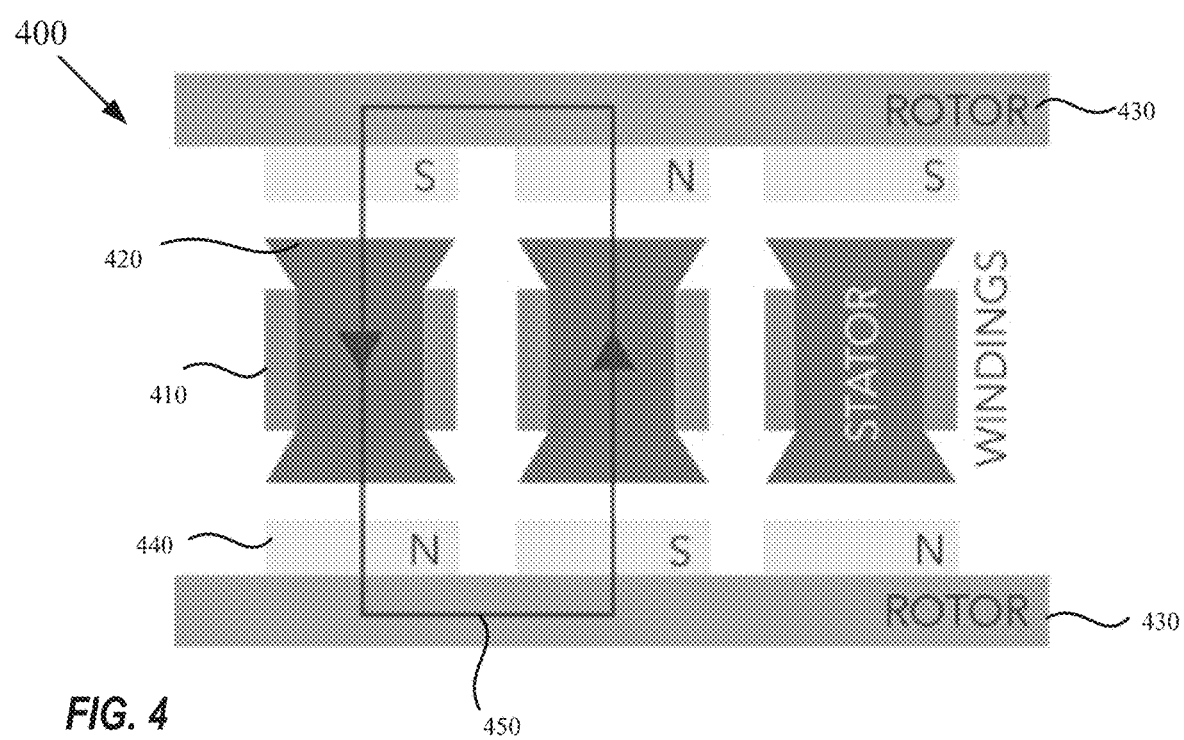
FIG. 4 illustrates a cross sectional view of an example yokeless axial flux electric motor.
Figure 5:
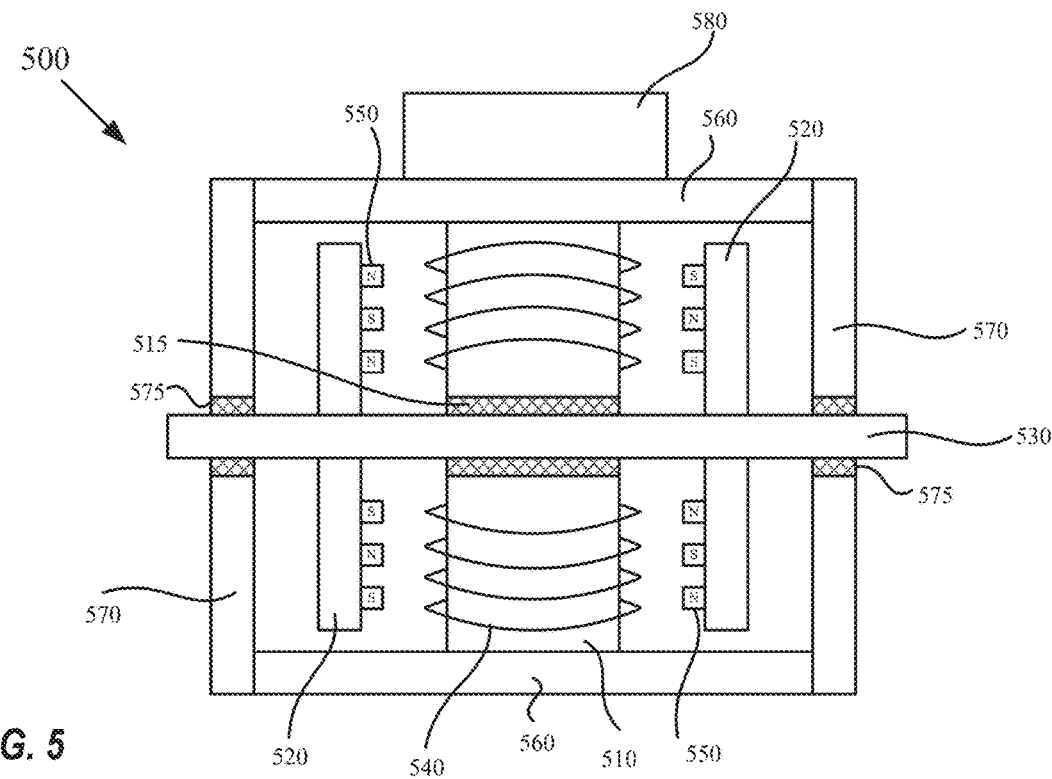
FIG. 5 illustrates a cross sectional view of an example axial flux yokeless motor.
Figure 6:
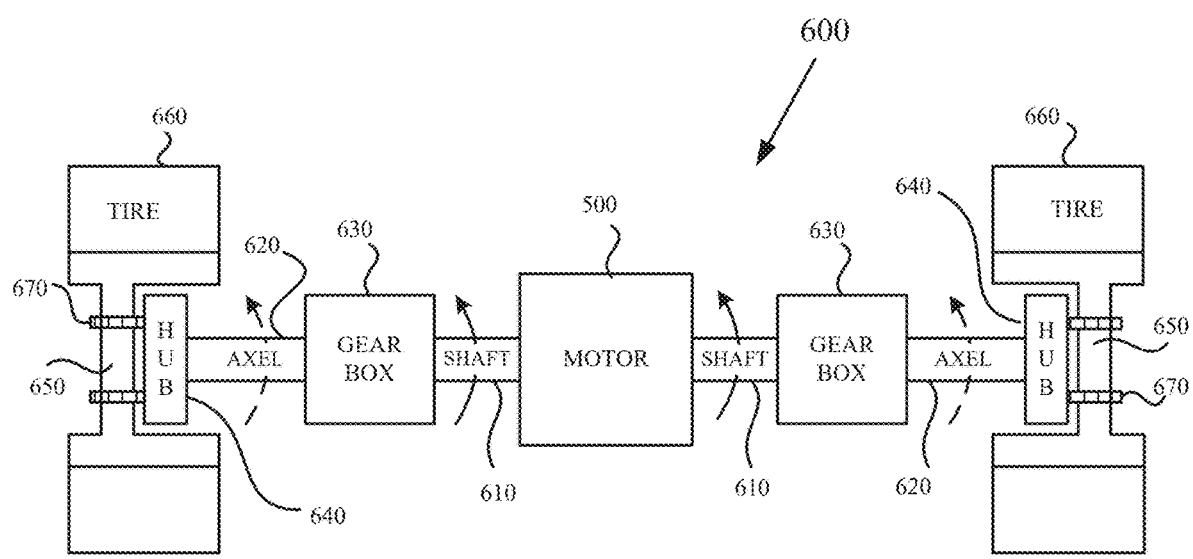
FIG. 6 illustrates an electric automobile utilizing an inrunner axial flux yokeless electric motor (such as that illustrated in FIG. 5).
Figure 7:
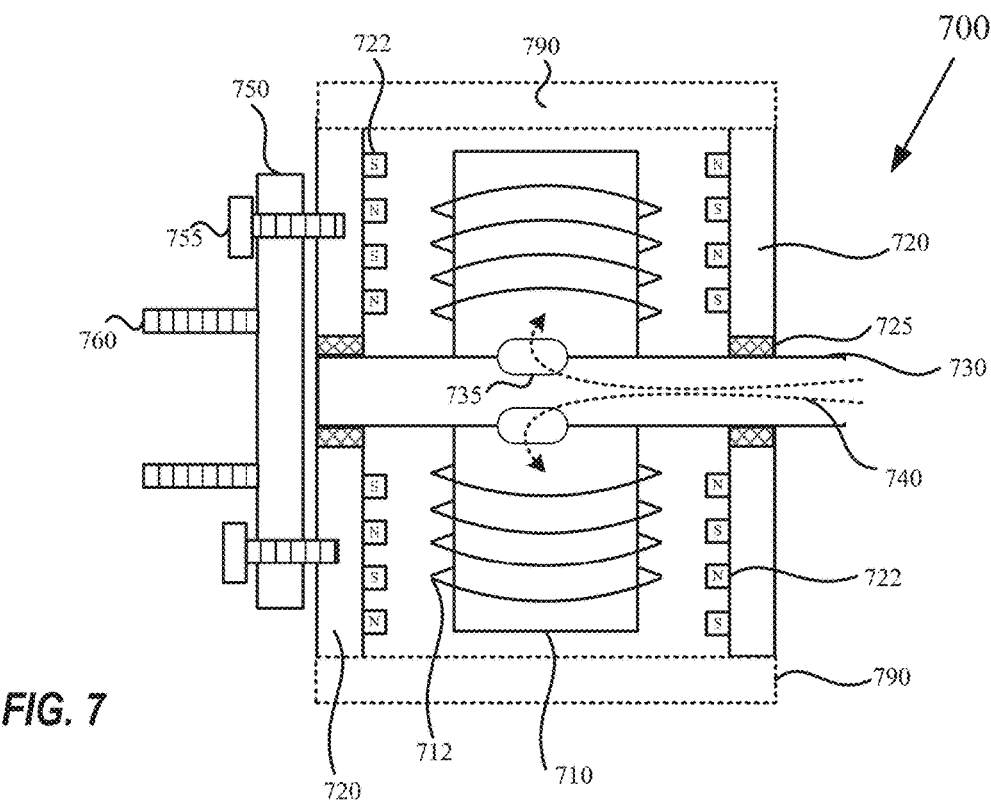
FIG. 7 illustrates a cross sectional view of an example outrunner axial flux yokeless motor, according to one embodiment.

FIG. 7 illustrates a cross sectional view of an example outrunner axial flux yokeless motor 700. The motor 700 includes a stator 710 and a pair of rotors 720 mounted on a shaft (non-rotating) 730. The rotors 720 include bearings 725 so that when they rotate, they can rotate around the shaft 730 without moving the shaft 730. The stator 710 includes windings 712, and the rotors 720 include magnets 722 facing the stator 710. The polarity of the magnets 722 alternates on each rotor 720 and also between each rotor 720. According to one embodiment, the rotors 720 may be slightly larger than the stator 710 so that the rotors 720 can be connected to one another with a connection means 790 (e.g., casing, rods) to ensure all the mechanical motion is available to be transferred. The connection means 790 is illustrated as connecting the tops and bottoms of the rotors 720 in cross sectional view, but is in no way intended to be limited thereto.

As the rotors 720, and possibly the connection means 790, are rotating, the power and cooling cannot be provided via an external means. As the shaft 730 is not rotating but is rather stationary, the shaft 730 may be hollow to allow cables and cooling 740 to traverse therein. The stator 710 and the shaft 730 may have openings 735 in alignment with each other that enable the cables and cooling 740 to be received by the stator 710.

A hub 750 is mounted to one of the rotors 720 with, for example, bolts 755. However, the manner in which the hub is secured to the rotor is not limited thereto. The hub 750 includes bolts 760 extending therefrom in alignment with holes in a rim. The hub 750 is utilized to mount the rim of the wheel onto the vehicle. The hub 750 is illustrated as being mounted external to the shaft 730 so no bearings are needed. However, the hub 750 is not limited thereto. Rather, the hub 750 could be located on and rotate around the shaft 730 utilizing bearings without departing the current scope. Furthermore, the size of the hub 750 is illustrated as being smaller than the size of the rotor 720 but is not limited thereto. Rather, the size of the various components is limited by the size of the wheel assembly.

According to one embodiment, the motor 700 may also include a plate (e.g., iron, steel) mounted to one of the rotors 720 or a plate mounted to each of the rotors 720 to provide support and/or protection for the motor (e.g., act as a housing). The plate(s) could be connected to the rotor(s) 720 with, for example, bolts, but is not limited thereto. The hub 750 may act as a plate on the one side of the motor 700. Alternatively, a plate could be mounted to the rotor 720 and the hub 750 could be mounted to the plate.

Figure 8:
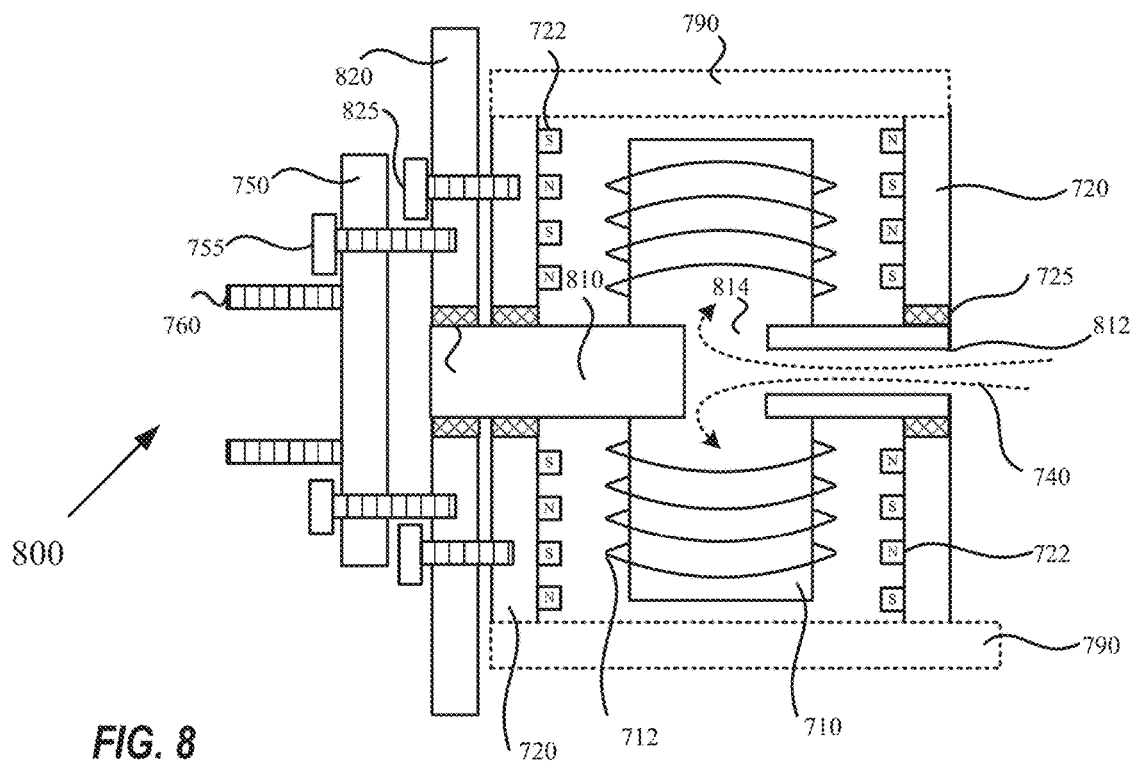
FIG. 8 illustrates a cross sectional view of an example outrunner axial flux yokeless motor, according to one embodiment.

FIG. 8 illustrates a cross sectional view of an example outrunner axial flux yokeless motor 800. The motor 800 is similar to the motor 700 of FIG. 7 except that the stator 710 includes a centrally located shaft like protrusion 810 extending therefrom in each direction in place of the shaft 730. The rotors 720 may be mounted on the protrusion 810 with bearings 725 to enable the rotors 720 to rotate therearound. One end of the protrusion 810 includes a centrally formed opening 812. The protrusion also includes an opening 814 into the stator 710. Like the hollow shaft 730, the openings 812, 814 in the protrusion 810 may be utilized to route the cables and cooling 740 to the stator 710.

As illustrated, the motor 800 includes a plate 820 acting as a housing on one side of the motor 800 (side facing wheel). The motor is not limited to a single plate on the wheel side. Rather, a plate could be located on both sides or only the non-wheel side without departing from the current scope. The plate is mounted to the rotor 720 with bolts 825. The manner in which the plate 820 is mounted to the rotor 720 is not limited thereto. As illustrated, the plate 820 is larger than the rotor 720 and is mounted on the protrusion 810 with bearings so that it rotates therearound. The size of the plate 820 is not limited thereto and the plate need not be mounted on the protrusion 810. The hub 755 is mounted to the plate 820. As with FIG. 7, the hub 750 is illustrated as being mounted external to the shaft 730 and as being smaller than the size of the rotor 720 but is not limited thereto.

Figure 9:
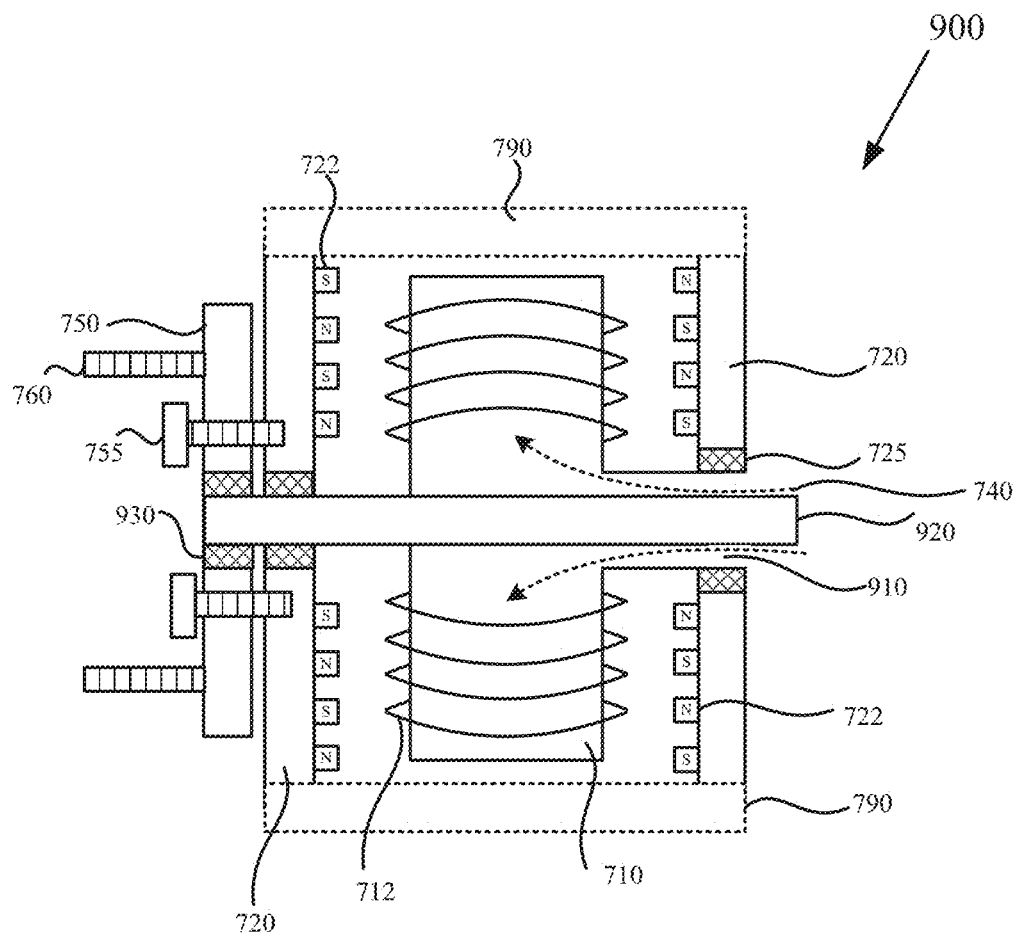
FIG. 9 illustrates a cross sectional view of an example outrunner axial flux yokeless motor, according to one embodiment.

FIG. 9 illustrates a cross sectional view of an example outrunner axial flux yokeless motor 900. The motor 900 is similar to the motor 800 of FIG. 8 except the stator 710 includes a hollow shaft like protrusion 910 that only extends in one direction (away from wheel assembly). The protrusion 910 extends over one end of a shaft (possibly solid) 920. One rotor 720 (one facing away from wheel assembly) is mounted to the protrusion 910 and one rotor 720 (one facing wheel assembly) is mounted to the shaft 920. An open area between the protrusion 910 and the shaft 920 is utilized to route the cables and cooling 740 to the stator 710.

As illustrated, the hub 750 is mounted on the shaft 920 with bearings 930 so that it rotates therearound. The configuration of the motor with regard to providing a housing and means for mounting the rim is in no way intended to be limited to that illustrated.

Figure 10:
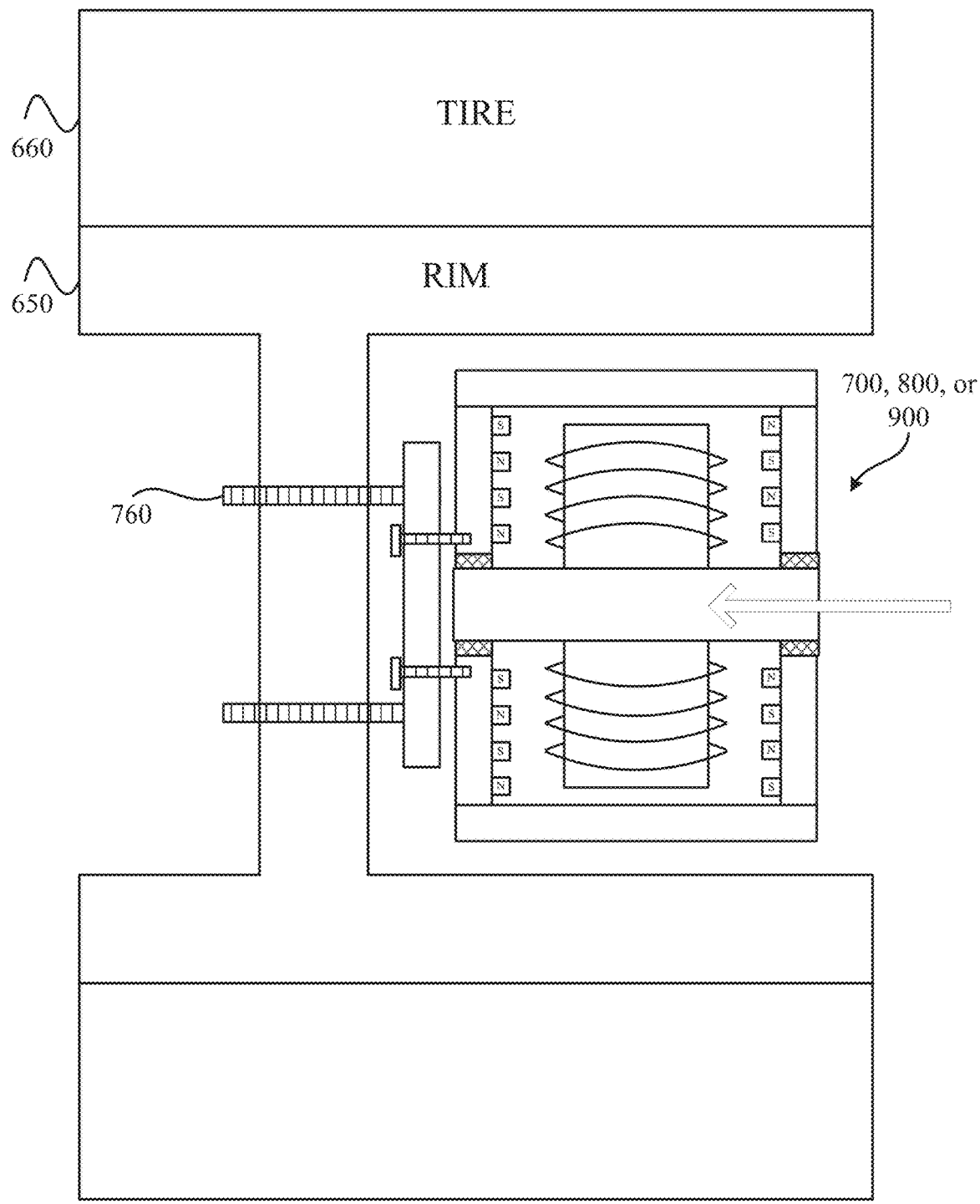
FIG. 10 illustrates a cross sectional view of an example outrunner axial flux yokeless outrunner motor providing cooling and cabling within the motor footprint (such as those illustrated in FIGS. 7-9) being utilized in a wheel assembly, according to one embodiment.

FIG. 10 illustrates a cross sectional view of an example outrunner axial flux yokeless outrunner motor providing cooling and cabling within the motor footprint (such as those illustrated in FIGS. 7-9) being utilized in a wheel assembly. The cables and the cooling are provided to the motor in and/or around the shaft in some fashion.

Although the disclosure has been illustrated by reference to specific embodiments, it will be apparent that the disclosure is not limited thereto as various changes and modifications may be made thereto without departing from the scope. The various embodiments are intended to be protected broadly within the spirit and scope of the appended claims.

The invention claimed is:

1. An electric motor comprising:
   a non-rotating shaft;
   a stator having a plurality of windings, wherein the stator is connected to the non-rotating shaft;
   a first rotor located on a first side of the stator having a plurality of magnets facing the stator, wherein the first rotor is secured to the non-rotating shaft via a bearing;
   a second rotor located on a second side of the stator having a plurality of magnets facing the stator, wherein the second rotor is secured to the non-rotating shaft via a bearing;
   an opening internal to the electric motor to provide cables and cooling to the stator; and
   a hub secured to opposite side of the first rotor as the plurality of magnets, wherein the hub includes a plurality of bolts extending therefrom to mount a rim thereto by placing the bolts through aligned holes in the rim.

2. The electric motor of claim 1, wherein the motor is mounted in a wheel assembly of an electric automobile.

3. The electric motor of claim 1, wherein a radius of the first and second rotors is greater than a radius of the stator and a connection means secures the first and the second rotors.

4. The electric motor of claim 1, wherein the opening is formed within the non-rotating shaft.

5. The electric motor of claim 1, wherein the non-rotating shaft is a shaft like protrusion extending from the stator and the opening is within the shaft like protrusion.

6. The electric motor of claim 1, wherein the stator includes a hollow shaft like protrusion extending toward the second rotor, wherein the shaft like protrusion is larger than the non-rotating shaft, wherein the non-rotating shaft passes through the shaft like protrusion, and wherein the opening is between the hollow shaft like protrusion and the non-rotating shaft.

7. An electric motor comprising:
   a non-rotating shaft;
   a stator having a plurality of windings and a hollow shaft like protrusion extending from a second side of the stator, wherein the stator is connected to the non-rotating shaft such that the non-rotating shaft passes through the hollow shaft like protrusion and creates an open area therebetween;
   cables and cooling for the stator routed through the open area;
   a first rotor located on a first side of the stator having a plurality of magnets facing the stator, wherein the first rotor is secured to the non-rotating shaft via a bearing;
   a second rotor located on the second side of the stator having a plurality of magnets facing the stator, wherein the second rotor is secured to the hollow shaft like protrusion via a bearing; and
   a hub secured to opposite side of the first rotor as the plurality of magnets, wherein the hub includes a plurality of bolts extending therefrom to mount a rim thereto by placing the bolts through aligned holes in the rim.

8. The electric motor of claim 7, wherein the motor is mounted in a wheel assembly of an electric automobile.

9. The electric motor of claim 7, wherein a radius of the first and second rotors is greater than a radius of the stator and a connection means secures the first and the second rotors.

10. An electric automobile comprising
    a chassis; and
    a plurality of wheel assemblies to receive a plurality of rims and an associated plurality of tires mounted to the rims;
    a plurality of electric motors, wherein an electric motor is housed within each of the plurality of wheel assemblies, wherein the electric motors include:
    a non-rotating shaft;
    a stator having a plurality of windings, wherein the stator is connected to the non-rotating shaft;
    a first rotor located on a first side of the stator having a plurality of magnets facing the stator, wherein the first rotor is secured to the non-rotating shaft via a bearing;
    a second rotor located on a second side of the stator having a plurality of magnets facing the stator, wherein the second rotor is secured to the non-rotating shaft via a bearing;
    an opening internal to the electric motor to provide cables and cooling to the stator; and
    a hub secured to opposite side of the first rotor as the plurality of magnets, wherein the hub includes a plurality of bolts extending therefrom to mount a rim thereto by placing the bolts through aligned holes in the rim.

11. The electric automobile of claim 10, wherein a radius of the first and second rotors is greater than a radius of the stator and a connection means secures the first and the second rotors.

12. The electric automobile of claim 10, wherein the opening is formed within the non-rotating shaft.

13. The electric automobile of claim 10, wherein the non-rotating shaft is a shaft like protrusion extending from the stator and the opening is within the shaft like protrusion.

14. The electric automobile of claim 10, wherein the stator includes a hollow shaft like protrusion extending toward the second rotor, wherein the shaft like protrusion is larger than the non-rotating shaft, wherein the non-rotating shaft passes through the shaft like protrusion, and wherein the opening is between the hollow shaft like protrusion and the non-rotating shaft.

\* \* \* \* \*